US011976256B2

(12) United States Patent
Peera et al.

(10) Patent No.: US 11,976,256 B2
(45) **Date of Patent: *May 7, 2024**

(54) LIQUID LAUNDRY DETERGENT FORMULATION

(71) Applicants: Dow Global Technologies LLC, Midland, MI (US); Rohm and Haas Company, Collegeville, PA (US)

(72) Inventors: Asghar A. Peera, Royersford, PA (US); Michael L. Tulchinsky, Midland, MI (US); Stephen J. Donovan, Sellersville, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 562 days.

This patent is subject to a terminal disclaimer.

(21) Appl. No.: 17/295,159

(22) PCT Filed: Dec. 5, 2019

(86) PCT No.: PCT/US2019/064577

§ 371 (c)(1),
(2) Date: May 19, 2021

(87) PCT Pub. No.: WO2020/123240

PCT Pub. Date: Jun. 18, 2020

(65) Prior Publication Data

US 2022/0002638 A1 Jan. 6, 2022

Related U.S. Application Data

(60) Provisional application No. 62/779,050, filed on Dec. 13, 2018.

(51) Int. Cl.
*C11D 3/30* (2006.01)
*C11D 3/26* (2006.01)
*C11D 3/43* (2006.01)

(52) U.S. Cl.
CPC .................. *C11D 3/30* (2013.01); *C11D 3/43* (2013.01); *C11D 2111/12* (2024.01)

(58) Field of Classification Search
None
See application file for complete search history.

(56) References Cited

U.S. PATENT DOCUMENTS

| | | | | |
|---|---|---|---|---|
| 2,683,730 | A | 7/1954 | Seeger et al. | |
| 3,293,297 | A | 12/1966 | Louvar et al. | |
| 3,499,009 | A | 3/1970 | Reymore, Jr. et al. | |
| 4,551,506 | A | 11/1985 | Gosselink | |
| 8,574,374 | B2 | 11/2013 | Marcos et al. | |
| 8,759,276 | B2 | 6/2014 | Man et al. | |
| 9,353,333 | B1 * | 5/2016 | Callahan .................. | C11D 1/02 |
| 9,592,294 | B2 | 3/2017 | Ladika et al. | |
| 9,605,163 | B2 | 3/2017 | Peera et al. | |
| 2005/0209125 | A1 | 9/2005 | Detering | |
| 2009/0005288 | A1 | 1/2009 | Boutique | |
| 2013/0171210 | A1 | 7/2013 | Baker | |
| 2014/0349907 | A1 | 11/2014 | Frankenbach et al. | |
| 2015/0091009 | A1 | 4/2015 | Yamazaki et al. | |
| 2015/0148890 | A1 | 5/2015 | Hartley et al. | |
| 2015/0329479 | A1 | 11/2015 | Chen | |

FOREIGN PATENT DOCUMENTS

| | | |
|---|---|---|
| GB | 910333 | 11/1962 |
| JP | 51016480 | 2/1976 |
| WO | 2018124989 | 7/2018 |

OTHER PUBLICATIONS

Search Report from corresponding Japanese Application No. 2021-531149 dated Jul. 27, 2023.
HE., "Interfacial sciences in unconventional petroleum production: from fundamentals to applications." Chem. Soc. Rev. 2015, p. 5478-5480, vol. 44.

* cited by examiner

*Primary Examiner* — Lorna M Douyon
(74) *Attorney, Agent, or Firm* — Thomas S. Deibert

(57) ABSTRACT

A liquid laundry detergent formulation is provided, comprising: a liquid carrier; a cleaning surfactant; and a cleaning booster, wherein the cleaning booster is of formula (I)

(I)

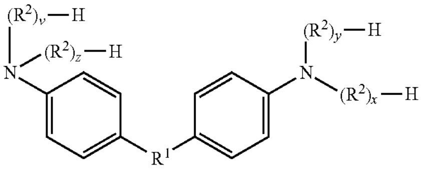

wherein $R^1$ is a $C_{1-4}$ alkylidene group; wherein each occurrence of $R^2$ is independently selected from a $C_{2-5}$ alkylene oxide group; and wherein the sum v+x+y+z is 4 to 1,600.

10 Claims, No Drawings

LIQUID LAUNDRY DETERGENT FORMULATION

The present invention relates to a liquid laundry detergent formulation. In particular, the present invention relates to a liquid laundry detergent formulation, comprising a liquid carrier, a cleaning surfactant and a cleaning booster, wherein the cleaning booster is of formula (I), wherein $R^1$ is a $C_{1-4}$ alkylidene group; wherein each occurrence of $R^2$ is independently selected from a $C_{2-5}$ alkylene oxide group; and wherein the sum v+x+y+z is 4 to 1,600.

Laundry detergents in liquid and gel forms providing excellent overall cleaning are desirable to consumers. Such laundry detergents typically include surfactants among other components to deliver the consumer desired cleaning benefits. Nevertheless, increasing sensitivity for the environment and rising material costs, a move to reduce the utilization of surfactants in laundry detergents is growing. Consequently, detergent manufactures are seeking ways to reduce the amount of surfactant per unit dose of the laundry detergent while maintaining overall cleaning performance.

One approach for reducing the unit dose of surfactant is to incorporate polymers into the liquid detergent formulations as described by Boutique et al. in U.S. Patent Application Publication No. 20090005288. Boutique et al. disclose a graft copolymer of polyethylene, polypropylene or polybutylene oxide with vinyl acetate in a weight ratio of from about 1:0.2 to about 1:10 for use in liquid or gel laundry detergent formulations having about 2 to about 20 wt % surfactant.

Notwithstanding, there remains a continuing need for liquid laundry detergent formulations exhibiting maintained primary cleaning performance with a reduced surfactant loading; preferably, while also providing improved anti-redeposition performance The present invention provides a liquid laundry detergent formulation, comprising: a liquid carrier; a cleaning surfactant; and a cleaning booster, wherein the cleaning booster is of formula (I)

(I)

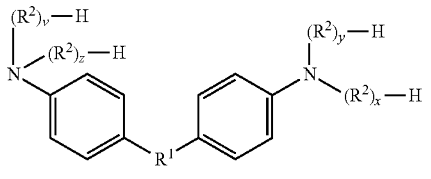

wherein $R^1$ is a $C_{1-4}$ alkylidene group; wherein each occurrence of $R^2$ is independently selected from a $C_{2-5}$ alkylene oxide group; and wherein the sum v+x+y+z is 4 to 1,600.

The present invention provides a liquid laundry detergent formulation, comprising: a liquid carrier; a cleaning surfactant; and a cleaning booster, wherein the cleaning booster is of formula (II)

(II)

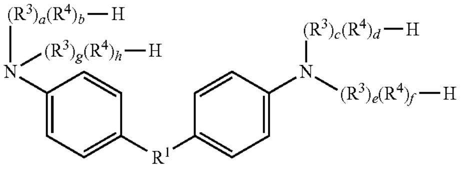

wherein $R^1$ is a $C_{1-4}$ alkylidene group; wherein each $R^3$ is a propylene oxide group; wherein each $R^4$ is an ethylene oxide group; wherein the sum a+c+e+g is 0 to 200; wherein the sum b+d+f+h is 0 to 200; and wherein the sum a+b+c+d+e+f+g+h is 4 to 400.

The present invention provides a liquid laundry detergent formulation, comprising: a liquid carrier; a cleaning surfactant; and a cleaning booster, wherein the cleaning booster is of formula (III)

(III)

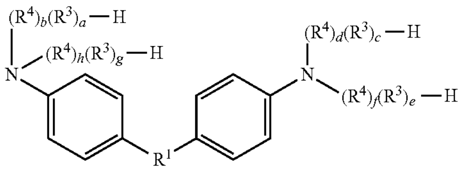

wherein $R^1$ is a $C_{1-4}$ alkylidene group; wherein each $R^3$ is a propylene oxide group; wherein each $R^4$ is an ethylene oxide group; wherein the sum a+c+e+g is 0 to 200; wherein the sum b+d+f+h is 0 to 200; and wherein the sum a+b+c+d+e+f+g+h is 4 to 400.

DETAILED DESCRIPTION

It has been surprisingly found that the liquid laundry detergent formulations with a cleaning booster as described herein facilitate maintained primary cleaning performance with reduced surfactant loading, while also providing a significant improvement in anti-redeposition performance over conventional booster additives.

Unless otherwise indicated, ratios, percentages, parts, and the like are by weight. Weight percentages (or wt %) in the composition are percentages of dry weight, i.e., excluding any water that may be present in the composition.

As used herein, unless otherwise indicated, the terms "weight average molecular weight" and "$M_w$" are used interchangeably to refer to the weight average molecular weight as measured in a conventional manner with gel permeation chromatography (GPC) and conventional standards, such as polystyrene standards. GPC techniques are discussed in detail in Modern Size Exclusion Liquid Chromatography: Practice of Gel Permeation and Gel Filtration Chromatography, Second Edition, Striegel, et al., John Wiley & Sons, 2009. Weight average molecular weights are reported herein in units of Daltons.

Preferably, the liquid laundry detergent formulation of the present invention, comprises a liquid carrier (preferably, 25 to 97.9 wt % (more preferably, 50 to 94.5 wt %; still more preferably, 62.5 to 91.75 wt %; yet more preferably, 70 to 89.9 wt %; most preferably, 76 to 88 wt %), based on weight of the liquid laundry detergent formulation, of the liquid carrier); a cleaning surfactant (preferably, 2 to 60 wt % (more preferably, 5 to 40 wt %; still more preferably, 7.5 to 30 wt %; yet more preferably, 10 to 25 wt %; most preferably, 10 to 20 wt %), based on weight of the liquid laundry detergent formulation, of the cleaning surfactant); and a cleaning booster (preferably, 0.1 to 15 wt % (more preferably, 0.5 to 10 wt %; still more preferably, 0.75 to 7.5 wt %; yet more preferably, 1 to 5 wt %; most preferably 2 to 4 wt %), based on weight of the liquid laundry detergent formulation, of the cleaning booster), wherein the cleaning booster is of formula (I)

(I)

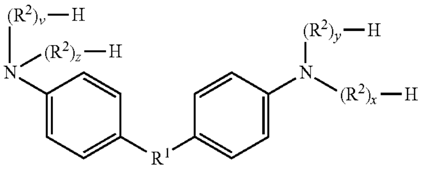

wherein $R^1$ is a $C_{1-4}$ alkylidene group (e.g., $-CH_2-$; $-CH(CH_3)-$; $-CH(C_2H_5)-$; $-C(CH_3)_2-$) (preferably, a $C_{1-3}$ alkylidene group; more preferably, a $C_{1-2}$ alkylidene group; most preferably, a methylene group); wherein each occurrence of $R^2$ is independently selected from a $C_{2-5}$ alkylene oxide group (preferably, an ethylene oxide group, a propylene oxide group and a butylene oxide group; more preferably, an ethylene oxide group and a propylene oxide group); and wherein the sum v+x+y+z is 4 to 1,600.

Preferably, the liquid laundry detergent formulation of the present invention, comprises a liquid carrier. More preferably, the liquid laundry detergent formulation of the present invention comprises 25 to 97.9 wt % (preferably, 50 to 94.5 wt %; more preferably, 62.5 to 91.75 wt %; yet more preferably, 70 to 89.9 wt %; most preferably, 76 to 88 wt %), based on weight of the liquid laundry detergent formulation, of a liquid carrier. Still more preferably, the liquid laundry detergent formulation of the present invention comprises 25 to 97.9 wt % (preferably, 50 to 94.5 wt %; more preferably, 62.5 to 91.75 wt %; yet more preferably, 70 to 89.9 wt %; most preferably, 76 to 88 wt %), based on weight of the liquid laundry detergent formulation, of a liquid carrier; wherein the liquid carrier comprises water. Most preferably, the liquid laundry detergent formulation of the present invention comprises 25 to 97.9 wt % (preferably, 50 to 94.5 wt %; more preferably, 62.5 to 91.75 wt %; yet more preferably, 70 to 89.9 wt %; most preferably, 76 to 88 wt %), based on weight of the liquid laundry detergent formulation, of a liquid carrier; wherein the liquid carrier is water.

Preferably, the liquid carrier can include water miscible liquids, such as, $C_{1-3}$ alkanolamines and $C_{1-3}$ alkanols. More preferably, the liquid carrier includes 0 to 8 wt % (preferably, 0.2 to 8 wt %; more preferably, 0.5 to 5 wt %), based on weight of the liquid carrier, of water miscible liquids; wherein the water miscible liquids are selected from the group consisting of $C_{1-3}$ alkanolamines, $C_{1-3}$ alkanols and mixtures thereof.

Preferably, the liquid laundry detergent formulation of the present invention, comprises: a cleaning surfactant. More preferably, the liquid laundry detergent formulation of the present invention, comprises: 2 to 60 wt % (more preferably, 5 to 40 wt %; still more preferably, 7.5 to 30 wt %; yet more preferably, 10 to 25 wt %; most preferably, 10 to 20 wt %), based on weight of the liquid laundry detergent formulation, of a cleaning surfactant. Still more preferably, the liquid laundry detergent formulation of the present invention, comprises: 2 to 60 wt % (more preferably, 5 to 40 wt %; still more preferably, 7.5 to 30 wt %; yet more preferably, 10 to 25 wt %; most preferably, 10 to 20 wt %), based on weight of the liquid laundry detergent formulation, of a cleaning surfactant; wherein the cleaning surfactant is selected from the group consisting of anionic surfactants, nonionic surfactants, cationic surfactants, amphoteric surfactants and mixtures thereof. Yet still more preferably, the liquid laundry detergent formulation of the present invention, comprises: 2 to 60 wt % (more preferably, 5 to 40 wt %; still more preferably, 7.5 to 30 wt %; yet more preferably, 10 to 25 wt %; most preferably, 10 to 20 wt %), based on weight of the liquid laundry detergent formulation, of a cleaning surfactant; wherein the cleaning surfactant is selected from the group consisting of a mixture including an anionic surfactant and a non-ionic surfactant. Most preferably, the liquid laundry detergent formulation of the present invention, comprises: 2 to 60 wt % (more preferably, 5 to 40 wt %; still more preferably, 7.5 to 30 wt %; yet more preferably, 10 to 25 wt %; most preferably, 10 to 20 wt %), based on weight of the liquid laundry detergent formulation, of a cleaning surfactant; wherein the cleaning surfactant includes a mixture of a linear alkyl benzene sulfonate, a sodium lauryl ethoxysulfate and a nonionic alcohol ethoxylate.

Anionic surfactants include alkyl sulfates, alkyl benzene sulfates, alkyl benzene sulfonic acids, alkyl benzene sulfonates, alkyl polyethoxy sulfates, alkoxylated alcohols, paraffin sulfonic acids, paraffin sulfonates, olefin sulfonic acids, olefin sulfonates, alpha-sulfocarboxylates, esters of alpha-sulfocarboxylates, alkyl glyceryl ether sulfonic acids, alkyl glyceryl ether sulfonates, sulfates of fatty acids, sulfonates of fatty acids, sulfonates of fatty acid esters, alkyl phenols, alkyl phenol polyethoxy ether sulfates, 2-acryloxy-alkane-1-sulfonic acid, 2-acryloxy-alkane-1-sulfonate, beta-alkyloxy alkane sulfonic acid, beta-alkyloxy alkane sulfonate, amine oxides and mixtures thereof. Preferred anionic surfactants include $C_{8-20}$ alkyl benzene sulfates, $C_{8-20}$ alkyl benzene sulfonic acid, $C_{8-20}$ alkyl benzene sulfonate, paraffin sulfonic acid, paraffin sulfonate, alpha-olefin sulfonic acid, alpha-olefin sulfonate, alkoxylated alcohols, $C_{8-20}$ alkyl phenols, amine oxides, sulfonates of fatty acids, sulfonates of fatty acid esters, $C_{8-10}$ alkyl polyethoxy sulfates and mixtures thereof. More preferred anionic surfactants include $C_{12-16}$ alkyl benzene sulfonic acid, $C_{12-16}$ alkyl benzene sulfonate, $C_{12-18}$ paraffin-sulfonic acid, $C_{12-18}$ paraffin-sulfonate, $C_{12-16}$ alkyl polyethoxy sulfate and mixtures thereof.

Non-ionic surfactants include alkoxylates (e.g., polyglycol ethers, fatty alcohol polyglycol ethers, alkylphenol polyglycol ethers, end group capped polyglycol ethers, mixed ethers, hydroxy mixed ethers, fatty acid polyglycol esters and mixtures thereof. Preferred non-ionic surfactants include fatty alcohol polyglycol ethers. More preferred non-ionic surfactants include secondary alcohol ethoxylates, ethoxylated 2-ethylhexanol, ethoxylated seed oils, butanol caped ethoxylated 2-ethylhexanol and mixtures thereof. Most preferred non-ionic surfactants include secondary alcohol ethoxylates.

Cationic surfactants include quaternary surface active compounds. Preferred cationic surfactants include quaternary surface active compounds having at least one of an ammonium group, a sulfonium group, a phosphonium group, an iodonium group and an arsonium group. More preferred cationic surfactants include at least one of a dialkyldimethylammonium chloride and alkyl dimethyl benzyl ammonium chloride. Still more preferred cationic surfactants include at least one of $C_{16-18}$ dialkyldimethylammonium chloride, a $C_{8-18}$ alkyl dimethyl benzyl ammonium chloride and dimethyl ditallow ammonium chloride. Most preferred cationic surfactant includes dimethyl ditallow ammonium chloride.

Amphoteric surfactants include betaines, amine oxides, alkylamidoalkylamines, alkyl-substituted amine oxides, acylated amino acids, derivatives of aliphatic quaternary ammonium compounds and mixtures thereof. Preferred amphoteric surfactants include derivatives of aliphatic quaternary ammonium compounds. More preferred amphoteric surfactants include derivatives of aliphatic quaternary ammonium compounds with a long chain group having 8 to 18 carbon atoms. Still more preferred amphoteric surfactants include at least one of $C_{12-14}$ alkyldimethylamine oxide, 3-(N,N-dimethyl-N-hexadecyl-ammonio)propane-1-sulfonate, 3-(N,N-dimethyl-N-hexadecylammonio)-2-hydroxypropane-1-sulfonate. Most preferred amphoteric surfactants include at least one of $C_{12-14}$ alkyldimethylamine oxide.

Preferably, the cleaning booster is of formula (I)

(I)

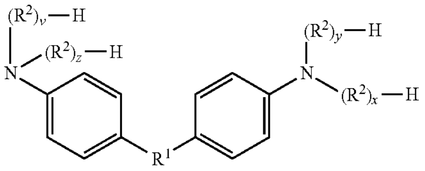

wherein $R^1$ is a $C_{1-4}$ alkylidene group (e.g., —$CH_2$—; —$CH(CH_3)$—; —$CH(C_2H_5)$—; —$C(CH_3)_2$—) (preferably, a $C_{1-3}$ alkylidene group; more preferably, a $C_{1-2}$ alkylidene group; most preferably, a methylene group); wherein each occurrence of $R^2$ is independently selected from a $C_{2-5}$ alkylene oxide group (preferably, an ethylene oxide group, a propylene oxide group and a butylene oxide group; more preferably, an ethylene oxide group and a propylene oxide group); and wherein the sum v+x+y+z is 4 to 1,600 (preferably, 8 to 1,000; more preferably, 52 to 752; still more preferably, 60 to 400; yet more preferably, 72 to 200; most preferably, 80 to 160).

Preferably, the cleaning booster has a weight average molecular weight of 370 to 93,200 Daltons (preferably, 500 to 60,000 Daltons; more preferably, 2,000 to 44,000 Daltons; still more preferably, 3,000 to 23,500 Daltons; yet more preferably, 3,500 to 12,000 Daltons; most preferably, 4,000 to 9,500 Daltons).

Preferably, the primary cleaning booster is of formula (I), wherein each occurrence of $R^2$ is independently selected from an ethylene oxide group, a propylene oxide group and a butylene oxide group; and wherein the cleaning booster has a weight average molecular weight of 370 to 93,200 Daltons (preferably, 500 to 60,000 Daltons; more preferably, 2,000 to 44,000 Daltons; still more preferably, 3,000 to 23,500 Daltons; yet more preferably, 3,500 to 12,000 Daltons; most preferably, 4,000 to 9,500 Daltons).

Preferably, the cleaning booster is of formula (II)

(II)

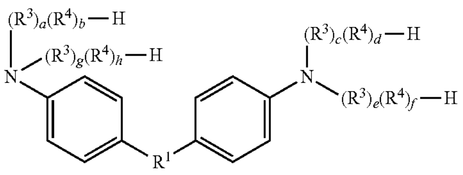

wherein $R^1$ is a $C_{1-4}$ alkylidene group (preferably, a $C_{1-3}$ alkylidene group; more preferably, a $C_{1-2}$ alkylidene group; most preferably, a methylene group); wherein each $R^3$ is a propylene oxide group; wherein each $R^4$ is an ethylene oxide group; wherein the sum a+c+e+g is 0 to 200 (preferably, 4 to 200; more preferably, 10 to 150; still more preferably, 25 to 125; most preferably, 50 to 100); wherein the sum b+d+f+h is 0 to 200 (preferably, 4 to 200; more preferably, 10 to 150; still more preferably, 25 to 125; most preferably, 50 to 100); and wherein the sum a+b+c+d+e+f+g+h is 4 to 400 (preferably, 8 to 400; more preferably, 52 to 400; still more preferably, 60 to 400; yet more preferably, 72 to 200; most preferably, 80 to 160). More preferably, the cleaning booster is of formula (II), wherein $R^1$ is a methylene group; wherein each $R^3$ is a propylene oxide group; wherein each $R^4$ is an ethylene oxide group; wherein the sum a+c+e+g is 0 to 200 (preferably, 4 to 200; more preferably, 10 to 150; still more preferably, 25 to 125; most preferably, 50 to 100); wherein the sum b+d+f+h is 0 to 200 (preferably, 4 to 200; more preferably, 10 to 150; still more preferably, 25 to 125; most preferably, 50 to 100); wherein the sum a+b+c+d+e+f+g+h is 4 to 400 (preferably, 8 to 400; more preferably, 52 to 400; still more preferably, 60 to 400; yet more preferably, 72 to 200; most preferably, 80 to 160); and wherein the cleaning booster has a weight average molecular weight of 4,000 to 9,500 Daltons. Most preferably, the cleaning booster is of formula (II), wherein $R^1$ is a methylene group; wherein each $R^3$ is a propylene oxide group; wherein each $R^4$ is an ethylene oxide group; wherein the sum a+c+e+g is 0 to 200 (preferably, 4 to 200; more preferably, 10 to 150; still more preferably, 25 to 125; most preferably, 50 to 100); wherein the sum b+d+f+h is 0 to 200 (preferably, 4 to 200; more preferably, 10 to 150; still more preferably, 25 to 125; most preferably, 50 to 100); wherein the sum a+b+c+d+e+f+g+h is 4 to 400 (preferably, 8 to 400; more preferably, 52 to 400; still more preferably, 60 to 400; yet more preferably, 72 to 200; most preferably, 80 to 160); wherein the cleaning booster has a weight average molecular weight of 4,000 to 9,500 Daltons; and wherein the weight ratio of propylene oxide groups to ethylene oxide groups in the cleaning booster is 0.25 to 3 (preferably, 0.5 to 2.75; more preferably, 0.75 to 2.5; most preferably, 1.0 to 2.25).

Preferably, the cleaning booster is of formula (III)

(III)

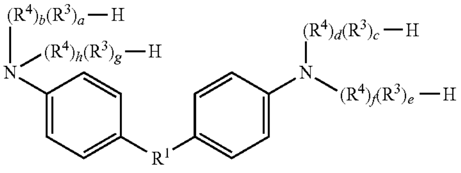

wherein $R^1$ is a $C_{1-4}$ alkylidene group (preferably, a $C_{1-3}$ alkylidene group; more preferably, a $C_{1-2}$ alkylidene group; most preferably, a methylene group); wherein each $R^3$ is a propylene oxide group; wherein each $R^4$ is an ethylene oxide group; wherein the sum a+c+e+g is 0 to 200 (preferably, 4 to 200; more preferably, 10 to 150; still more preferably, 25 to 125; most preferably, 50 to 100); wherein the sum b+d+f+h is 0 to 200 (preferably, 4 to 200; more preferably, 10 to 150; still more preferably, 25 to 125; most preferably, 50 to 100); and wherein the sum a+b+c+d+e+f+g+h is 4 to 400 (preferably, 8 to 400; more preferably, 52 to 400; still more preferably, 60 to 400; yet more preferably, 72 to 200; most preferably, 80 to 160). More preferably, the cleaning booster is of formula (III), wherein $R^1$ is a methylene group; wherein each $R^3$ is a propylene oxide group; wherein each $R^4$ is an ethylene oxide group; wherein the sum a+c+e+g is 0 to 200 (preferably, 4 to 200; more preferably, 10 to 150; still more preferably, 25 to 125; most preferably, 50 to 100); wherein the sum b+d+f+h is 0 to 200 (preferably, 4 to 200; more preferably, 10 to 150; still more preferably, 25 to 125; most preferably, 50 to 100); wherein the sum a+b+c+d+e+f+g+h is 4 to 400 (preferably, 8 to 400; more preferably, 52 to 400; still more preferably, 60 to 400; yet more preferably, 72 to 200; most preferably, 80 to 160); and wherein the cleaning booster has a weight average molecular weight of 4,000 to 9,500 Daltons. Most preferably, the cleaning booster is of formula (III), wherein $R^1$ is a methylene group; wherein each $R^3$ is a propylene oxide group; wherein each $R^4$ is an ethylene oxide group; wherein the sum a+c+e+g is 0 to 200 (preferably, 4 to 200; more preferably, 10 to 150; still more preferably, 25 to 125; most preferably, 50 to 100); wherein the sum b+d+f+h is 0 to 200 (preferably, 4 to 200; more preferably, 10 to 150; still more preferably, 25 to 125; most preferably, 50 to 100); wherein the sum a+b+c+d+e+f+g+h is 4 to 400 (preferably, 8 to 400; more preferably, 52 to 400; still more preferably, 60 to 400; yet more preferably, 72 to 200; most preferably, 80 to 160); wherein the cleaning booster has a weight average molecular weight of 4,000 to 9,500 Daltons; and wherein the weight ratio of propylene oxide groups to ethylene oxide groups in the cleaning booster is 0.25 to 3 (preferably, 0.5 to 2.75; more preferably, 0.75 to 2.5; most preferably, 1.0 to 2.25).

Preferably, the liquid laundry detergent formulation of the present invention, optionally further comprises a structurant. More preferably, the liquid laundry detergent formulation of the present invention, further comprises 0 to 2 wt % (preferably, 0.05 to 0.8 wt %; more preferably, 0.1 to 0.4 wt %), based on weight of the liquid laundry detergent formulation, of a structurant. Most preferably, the liquid laundry detergent formulation of the present invention, further comprises 0 to 2 wt % (preferably, 0.05 to 0.8 wt %; more preferably, 0.1 to 0.4 wt %), based on weight of the liquid laundry detergent formulation, of a structurant; wherein the structurant is a non-polymeric, crystalline hydroxy-functional materials capable of forming thread like structuring systems throughout the liquid laundry detergent formulation when crystallized in situ.

Preferably, the liquid laundry detergent formulation of the present invention, optionally further comprises a hydrotrope. More preferably, the liquid laundry detergent formulation of the present invention, optionally further comprises: 0 to 10 wt % (preferably, 0.1 to 7.5 wt %; more preferably, 0.2 to 5 wt %; most preferably, 0.5 to 2.5 wt %), based on the weight of the liquid laundry detergent formulation, of a hydrotrope. More preferably, the liquid laundry detergent formulation of the present invention, optionally further comprises: 0 to 10 wt % (preferably, 0.1 to 7.5 wt %; more preferably, 0.2 to 5 wt %; most preferably, 0.5 to 2.5 wt %), based on the weight of the liquid laundry detergent formulation, of a hydrotrope; wherein the hydrotrope is selected from the group consisting of alkyl hydroxides; glycols; urea; monoethanolamine; diethanolamine; triethanolamine; calcium, sodium, potassium, ammonium and alkanol ammonium salts of xylene sulfonic acid, toluene sulfonic acid, ethylbenzene sulfonic acid, naphthalene sulfonic acid and cumene sulfonic acid; salts thereof and mixtures thereof. Most preferably, the liquid laundry detergent formulation of the present invention, further comprises: 0 to 10 wt % (preferably, 0.1 to 7.5 wt %; more preferably, 0.2 to 5 wt %; most preferably, 0.5 to 2.5 wt %), based on the weight of the liquid laundry detergent formulation, of a hydrotrope; wherein the hydrotrope is selected from the group consisting of ethanol, propylene glycol, sodium toluene sulfonate, potassium toluene sulfonate, sodium xylene sulfonate, ammonium xylene sulfonate, potassium xylene sulfonate, calcium xylene sulfonate, sodium cumene sulfonate, ammonium cumene sulfonate and mixtures thereof.

Preferably, the liquid laundry detergent formulation of the present invention, optionally further comprises a fragrance. More preferably, the liquid laundry detergent formulation of the present invention, optionally further comprises: 0 to 10 wt % (preferably, 0.001 to 5 wt %; more preferably, 0.005 to 3 wt %; most preferably, 0.01 to 2.5 wt %), based on the weight of the liquid laundry detergent formulation, of a fragrance.

Preferably, the liquid laundry detergent formulation of the present invention, optionally further comprises a builder. More preferably, the liquid laundry detergent formulation of the present invention, optionally further comprises: 0 to 50 wt % (preferably, 5 to 50 wt %; more preferably, 7.5 to 30 wt %), based on the weight of the liquid laundry detergent formulation, of a builder. Most preferably, the liquid laundry detergent formulation of the present invention, optionally further comprises: 0 to 50 wt % (preferably, 5 to 50 wt %; more preferably, 7.5 to 30 wt %), based on the weight of the liquid laundry detergent formulation, of a builder; wherein the builder; wherein the builder is selected from the group consisting of inorganic builders (e.g., tripolyphosphate, pyrophosphate); alkali metal carbonates; borates; bicarbonates; hydroxides; zeolites; citrates (e.g., sodium citrate); polycarboxylates; monocarboxylates; aminotrismethylenephosphonic acid; salts of aminotrismethylenephosphonic acid; hydroxyethanediphosphonic acid; salts of hydroxyethanediphosphonic acid; diethylenetriaminepenta(methylenephosphonic acid); salts of diethylenetriaminepenta(methylenephosphonic acid); ethylenediaminetetraethylenephosphonic acid; salts of ethylenediaminetetraethylenephosphonic acid; oligomeric phosphonates; polymeric phosphonates; mixtures thereof.

Preferably, the liquid laundry detergent formulation of the present invention, optionally further comprises a fabric softener. More preferably, the liquid laundry detergent formulation of the present invention, optionally further comprises: 0 to 10 wt % (preferably, 0.5 to 10 wt %), based on the weight of the liquid laundry detergent formulation, of a fabric softener. Most preferably, the liquid laundry detergent formulation of the present invention, optionally further comprises: 0 to 10 wt % (preferably, 0.5 to 10 wt %), based on the weight of the liquid laundry detergent formulation, of a fabric softener; wherein the fabric softener is a cationic coacervating polymer (e.g., cationic hydroxyl ethyl cellulose; polyquaternium polymers and combinations thereof).

Preferably, the liquid laundry detergent formulation of the present invention, optionally further comprises a pH adjusting agent. More preferably, the liquid laundry detergent formulation of the present invention, optionally further comprises a pH adjusting agent; wherein the liquid laundry detergent formulation has a pH from 6 to 12.5 (preferably, 6.5 to 11; more preferably, 7.5 to 10). Bases for adjusting pH include mineral bases such as sodium hydroxide (including soda ash) and potassium hydroxide; sodium bicarbonate; sodium silicate; ammonium hydroxide; and organic bases (e.g., mono-, di- or tri-ethanolamine; and 2-dimethylamino-2-methyl-1-propanol (DMAMP)). Acids to adjust the pH include mineral acids (e.g., hydrochloric acid, phosphorus acid and sulfuric acid) and organic acids (e.g., acetic acid).

Some embodiments of the present invention will now be described in detail in the following Examples.

SYNTHESIS Q1-Q2: CLEANING BOOSTER

Synthesis Q1-Q2 were carried out in a Symyx PPR® setup containing 48 reactors. Each reactor was equipped with a glass insert and a removable PEEK stir paddle. A glass insert along with a removable PEEK stir paddle for each cell were dried in a vacuum oven at 125° C. The propylene oxide and ethylene oxide used in the synthesis were delivered to the reactor via an ISCO syringe pump equipped with a robotically controlled needle and compressed gas micro valve.

Each of 16 reactors was then charged with 4,4'-methylenedianiline (PMDA) (1.98 g) under nitrogen. The reactors were then sealed and charged with propylene oxide (PO) (2.32 g). The temperature set point for the reactors was then set to 140° C. and the reactor contents were stirred for 24 hours after reaching temperature. The heat source was then removed and the reactors were then cooled, vented and purged with nitrogen to remove any residual propylene oxide from the reactors providing a PMDA-$PO_4$ starter. The contents from the 16 reactors was combined and a small sample was then taken for NMR analysis.

The PMDA-$PO_4$ starter (10 g) was mixed with a calculated amount of 50 wt % KOH solution in a round bottom flask to make 20 wt % KOH mixture relative to the starter. Then 100 to 150 mL of toluene was added and water was removed azeotropically at 110° C. using a Dean-Stark trap. The remaining toluene was evaporated in vacuum. The dry starter containing the KOH catalyst was weighed into glass inserts in the amounts indicated in Table 1. The glass inserts along with the stir paddles were loaded to the corresponding PPR wells and the reactors were sealed. The cells were charged by robot with calculated amounts of propylene oxide (PO) shown in Table 1. The temperature was increased to 115° C. and the reaction mixtures were stirred for 48 hours after reaching process temperature. The pressure in the reactors gradually leveled off, indicating that the reactions were completed. The cells were cooled, vented and purged with nitrogen to remove any residual PO.

The reactor contents were then heated to 50° C. and ethylene oxide (EO) was added in the amount noted in Table 1. The temperature set point for the reactor was then set to 130° C. and the reactor contents were stirred for 4 hours after reaching temperature. The heat source was then removed and the reactor was cooled, vented and purged with nitrogen to provide the product cleaning boosters. The number average and weight average molecular weights of the product cleaning boosters measured by gel permeation chromatography are provided in Table 1.

TABLE 1

| | | | | Molecular weight (Daltons) | |
|---|---|---|---|---|---|
| Example | PMDA-$PO_4$ | PO (g) | EO (g) | $M_n$ | $M_w$ |
| Synthesis Q1 | 0.27 | 2.88 | 1.44 | 7,639 | 7,874 |
| Synthesis Q2 | 0.27 | 2.18 | 2.18 | 7,412 | 7,684 |

COMPARATIVE EXAMPLES C1-C2 AND EXAMPLES 1-2: LIQUID LAUNDRY DETERGENT

The liquid laundry detergent formulations used in the anti-redeposition tests in the subsequent Examples were prepared having the generic formulation as described in Table 2 with the cleaning booster as noted in Table 3 and were prepared by standard liquid laundry formulation preparation procedures.

TABLE 2

| Ingredient | Commercial Name | wt % |
|---|---|---|
| Linear alkyl benzene sulfonate | Nacconal 90G* | 12.0 |
| Sodium lauryl ethoxysulfate | Steol CS-460* | 2.0 |
| Cleaning Booster | — | 3.0 |
| Deionized water | — | QS to 100 |

*available from Stepan Company

TABLE 3

| Example | Cleaning Booster |
|---|---|
| Comparative Example C1 | poly(acrylic acid)[1] |
| Comparative Example C2 | ethoxylated poly(ethyleneimine)[2] |
| Example 1 | product of Synthesis Q1 |
| Example 2 | product of Synthesis Q2 |

[1]available from The Dow Chemical Company under tradename Acusol™ 445
[2]available from BASF under the tradename Sokolan™ HP-20

ANTI-REDEPOSITION

The anti-redeposition performance of the liquid laundry detergent formulations of Comparative Examples C1-C2 and Examples 1-2 were assessed in a Terg-o-tometer Model 7243ES agitated at 90 cycles per minute with the conditions noted in Table 4.

TABLE 4

| Parameter | Setting |
|---|---|
| Temperature | 25° C. |
| Water hardness | 300 ppm, Ca/Mg = 2/1 |
| Fabric Types | Cotton Terry (CT)<br>Cotton (C)<br>Polyester: cotton blend (PB)<br>Cotton interlock (CI) |
| Wash time | 60 minutes |
| Rinse time | 3 minutes |
| Liquid laundry detergent dosage | 0.5 g/L |
| Anti-redeposition soils | 0.625 g/L Big Oak Clay (sourced locally from southeastern Pennsylvania)<br>2.5 g/L Body Sebum Emulsion (Scientific Services S/D Inc.) |

The fabrics were laundered for 5 consecutive cycles and the whiteness index was measured at 460 nm using a HunderLab UltraScan VIS Colorimeter to determine fabric whiteness in accordance with ASTM E313. The whiteness index for the neat unwashed fabrics was used as the positive control. The change in the whiteness index relative to the positive control for each of the liquid laundry formulations are provided in Table 5.

TABLE 5

| | Delta in Whiteness Index | | | |
|---|---|---|---|---|
| Ex. | CT | C | PB | CI |
| Comparative Example C1 | 71.75 | 15.81 | 23.86 | 34.9 |
| Comparative Example C2 | 92.57 | 23.17 | 28.14 | 46.48 |
| Example 1 | 25.40 | 4.12 | 18.05 | 4.13 |
| Example 2 | 26.15 | 4.91 | 19.93 | 4.26 |

COMPARATIVE EXAMPLE C3 AND EXAMPLE 3: LIQUID LAUNDRY DETERGENT FORMULATIONS

The liquid laundry detergent formulations used in the primary cleaning performance tests in the subsequent Examples were prepared having the generic formulation as described in Table 6 with the cleaning booster as noted in Table 7 and were prepared by standard liquid laundry formulation preparation procedures.

TABLE 6

| Ingredient | Commercial Name | wt % |
|---|---|---|
| Linear alkyl benzene sulfonate | Nacconal 90G* | 8.0 |
| Sodium lauryl ethoxysulfate | Steol CS-460* | 2.0 |
| Nonionic alcohol ethoxylate | Biosoft N25-7* | 4.0 |
| Cleaning Booster | — | 3.0 |
| Deionized water | — | QS to 100 |

*available from Stepan Company

TABLE 7

| Example | Cleaning Booster |
|---|---|
| Comparative Example C3 | ethoxylated poly(ethyleneimine)[1] |
| Example 3 | product of Synthesis Q1 |

[1]available from BASF under the tradename Sokolan™ HP-20

PRIMARY CLEANING PERFORMANCE

The primary cleaning performance of the liquid laundry detergent formulations of Comparative Example C3 and Example 3 were assessed in a Terg-o-tometer Model TOM-52-A available from SR Lab Instruments (6×1 L wells) agitated at 90 cycles per minute with the conditions noted in Table 8.

TABLE 8

| Parameter | Setting |
|---|---|
| Temperature | 15° C. |
| Water hardness | 200 ppm, Ca/Mg = 2/1 |
| Fabric Types (3 in each well) | Stained Cotton 400 |
| Stains | Clay, Motor Oil and Dust Sebum (Bought from Scientific Services S/D, Inc.) |
| Wash time | 16 minutes |
| Rinse time | 3 minutes |
| Liquid laundry detergent dosage | 0.5 g/L |

The soil removal index (SRI) was calculated using ASTM Method D4265-14. The ΔSRI was determined in reference to a control detergent with the same surfactant concentrations absent cleaning booster. The results are provided in Table 9.

TABLE 9

| | Stain ΔSRI | | Y - Reflectance | |
|---|---|---|---|---|
| Example | Ground Clay | Dust Sebum | Ground Clay | Dust Sebum |
| Control (no polymer) | — | — | 65.9 | 56.3 |
| Comp. Ex. 3 | +8 | +1 | 68.8 | 57.1 |
| Ex. 3 | +8 | +4 | 69.8 | 58.4 |

We claim:

1. A liquid laundry detergent formulation, comprising:
a liquid carrier;
a cleaning surfactant; and
a cleaning booster, wherein the cleaning booster is of formula (I)

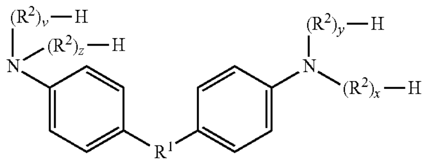

(I)

wherein $R^1$ is a $C_{1-4}$ alkylidene group;
wherein each occurrence of $R^2$ is independently selected from a $C_{2-5}$ alkylene oxide group; and
wherein the sum v+x+y+z is 4 to 1,600.

2. The liquid laundry detergent formulation of claim 1, wherein the liquid laundry detergent formulation comprises
25 to 97.9 wt %, based on weight of the liquid laundry detergent formulation, of the liquid carrier;
2 to 60 wt %, based on weight of the liquid laundry detergent formulation, of the cleaning surfactant; and
0.1 to 15 wt %, based on weight of the liquid laundry detergent formulation, of the cleaning booster.

3. The liquid laundry detergent formulation of claim 1, wherein the liquid carrier comprises water.

4. The liquid laundry detergent formulation of claim 3, wherein each occurrence of $R^2$ is independently selected from an ethylene oxide group, a propylene oxide group and a butylene oxide group.

5. The liquid laundry detergent formulation of claim 4, wherein the cleaning booster is of formula (II)

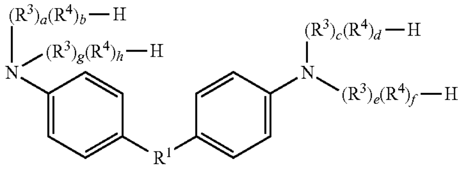

(II)

wherein $R^1$ is a $C_{1-4}$ alkylidene group;
wherein each $R^3$ is a propylene oxide group;
wherein each $R^4$ is an ethylene oxide group;
wherein the sum a+c+e+g is 0 to 200;
wherein the sum b+d+f+h is 0 to 200; and
wherein the sum a+b+c+d+e+f+g+h is 4 to 400.

6. The liquid laundry detergent formulation of claim 5, wherein $R^1$ is a methylene group.

7. The liquid laundry detergent formulation of claim 6, wherein the cleaning booster has a weight average molecular weight of 4,000 to 9,500 Daltons.

8. The liquid laundry detergent formulation of claim 7, wherein the weight ratio of the propylene oxide groups to the ethylene oxide groups in the cleaning booster is 0.25 to 3.

9. The liquid laundry detergent formulation of claim 4, wherein the cleaning booster is of formula (III)

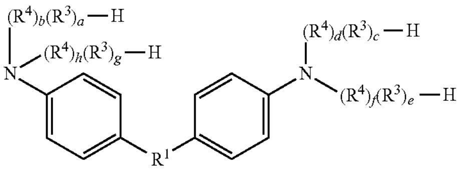

(III)

wherein $R^1$ is a $C_{1-4}$ alkylidene group;
wherein each $R^3$ is a propylene oxide group;
wherein each $R^4$ is an ethylene oxide group;
wherein the sum a+c+e+g is 0 to 200;
wherein the sum b+d+f+h is 0 to 200; and
wherein the sum a+b+c+d+e+f+g+h is 4 to 400.

10. The liquid laundry detergent formulation of claim 9, wherein $R^1$ is a methylene group; wherein the cleaning booster has a weight average molecular weight of 4,000 to 9,500 Daltons; and wherein the weight ratio of the propylene oxide groups to the ethylene oxide groups in the cleaning booster is 0.25 to 3.

* * * * *